(12) United States Patent
Tan

(10) Patent No.: US 11,190,068 B2
(45) Date of Patent: Nov. 30, 2021

(54) ROTOR SHEET, ROTOR, AND ELECTRICAL MACHINE, AND METHOD FOR PRODUCING A ROTOR

(71) Applicant: VALEO SIEMENS EAUTOMOTIVE GERMANY GMBH, Erlangen (DE)

(72) Inventor: Kae Shyuan Tan, Niederwerrn (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 178 days.

(21) Appl. No.: 16/715,575

(22) Filed: Dec. 16, 2019

(65) Prior Publication Data

US 2020/0195070 A1 Jun. 18, 2020

(30) Foreign Application Priority Data

Dec. 17, 2018 (DE) ...................... 10 2018 132 502.9

(51) Int. Cl.
*H02K 1/27* (2006.01)
*H02K 7/04* (2006.01)
*H02K 15/03* (2006.01)
*H02K 15/16* (2006.01)

(52) U.S. Cl.
CPC .............. *H02K 1/276* (2013.01); *H02K 7/04* (2013.01); *H02K 15/03* (2013.01); *H02K 15/165* (2013.01); *H02K 2213/03* (2013.01)

(58) Field of Classification Search
CPC ........ H02K 1/27; H02K 1/276; H02K 1/2766; H02K 7/00; H02K 7/04; H02K 15/00; H02K 15/03; H02K 15/16; H02K 15/165
See application file for complete search history.

(56) References Cited

U.S. PATENT DOCUMENTS

| 8,587,175 | B2* | 11/2013 | Yamaguchi | ............ | H02K 1/276 310/156.53 |
| 9,246,363 | B2 | 1/2016 | Dickinson et al. | | |
| 2014/0091664 | A1* | 4/2014 | Aoyama | ................ | H02K 1/274 310/156.53 |
| 2017/0317540 | A1* | 11/2017 | Laldin | .................. | H02K 1/2706 310/156.53 |

(Continued)

FOREIGN PATENT DOCUMENTS

EP  3 352 331 A1  7/2018

*Primary Examiner* — Tran N Nguyen
(74) *Attorney, Agent, or Firm* — Manabu Kanesaka

(57) ABSTRACT

A rotor sheet includes a central cut-out and is divided into a plurality of sectors, each including a first half sector and a second half sector delimited from the first half sector by a radial central line, wherein a through-opening configuration, which has two parallel edge lines extending along an extension direction, is formed inside the first half sector, and a further through-opening configuration, mirror-symmetrical to the through-opening configuration with respect to the central line, is formed inside the second half sector, wherein the first through-opening configuration includes a relief through-opening inscribed inside an incircle-free trapezoid having two bases extending parallel to the central line and two legs extending on a first straight line having a first angular spacing from the central line, and on a second straight line having a second angular spacing from the central line, wherein the first and second straight lines intersect at an acute angle.

15 Claims, 7 Drawing Sheets

(56) References Cited

U.S. PATENT DOCUMENTS

2017/0366056 A1* 12/2017 Tang .................... H02K 1/2766
              310/156.53
2017/0373573 A1* 12/2017 Sidiropoulos ........... B60L 58/10
              310/156.53

* cited by examiner

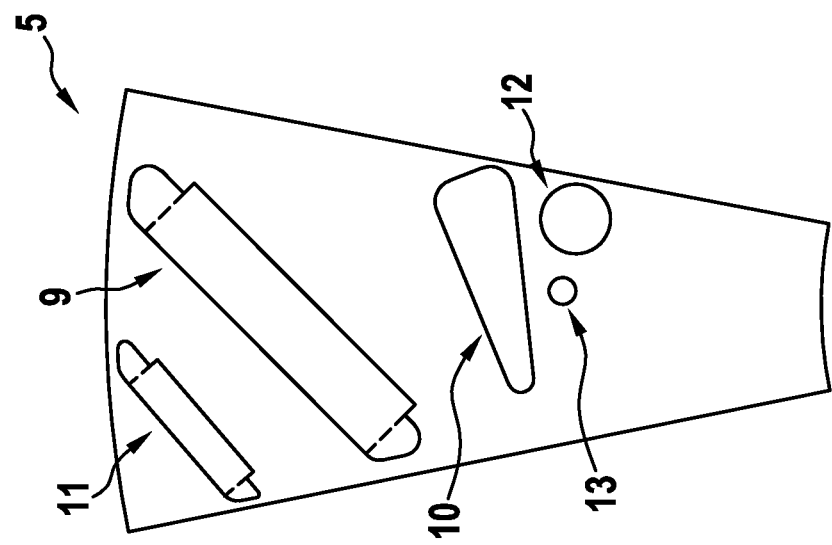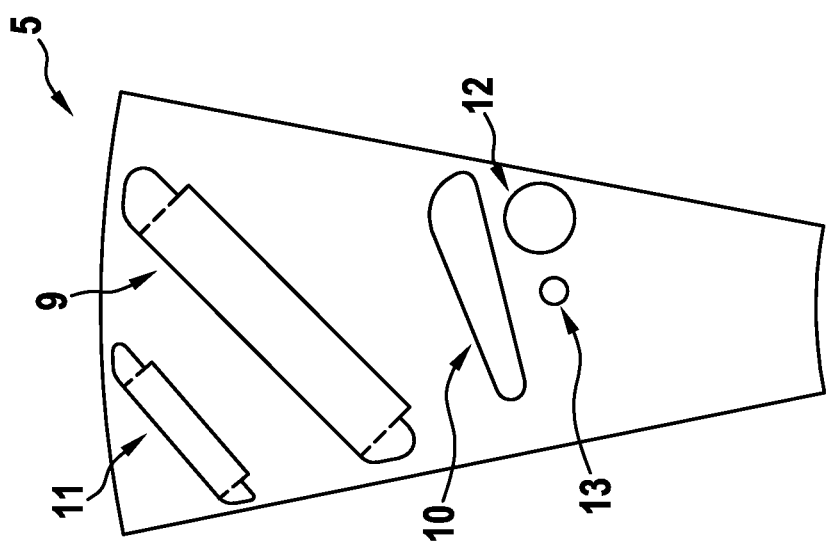

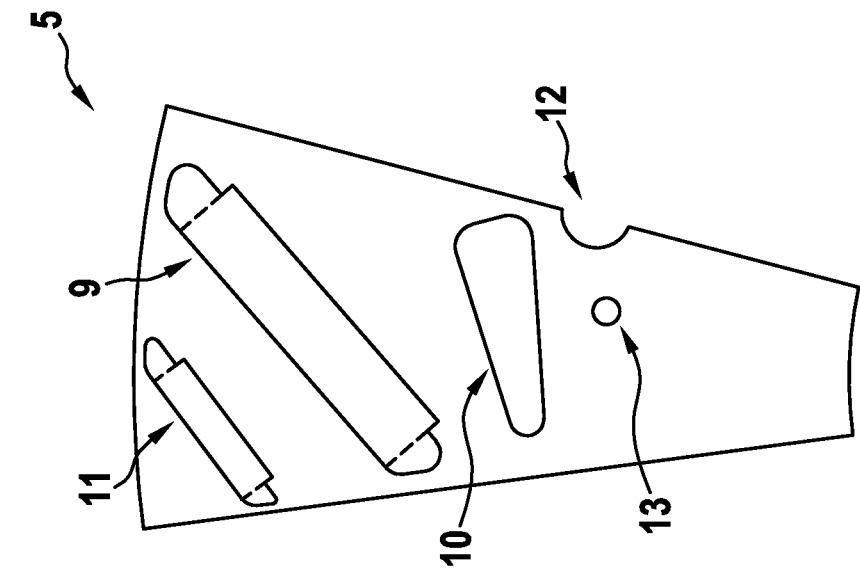
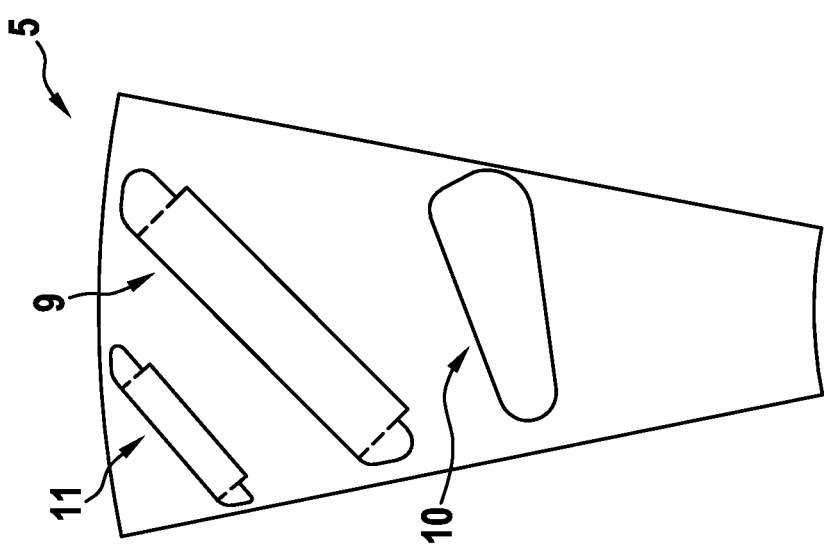

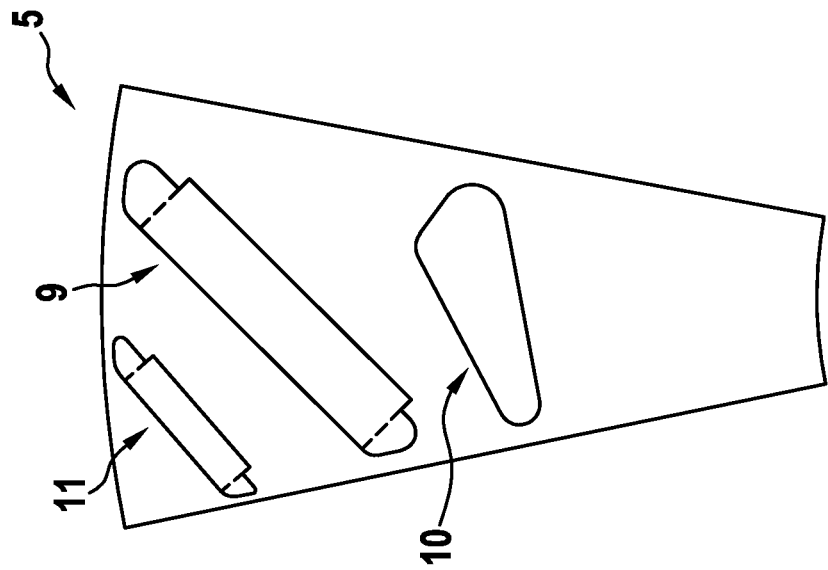
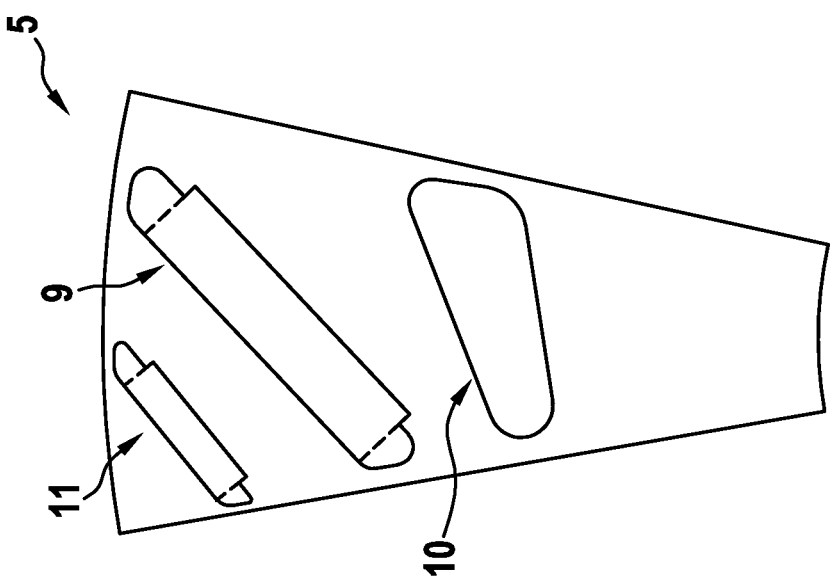

ROTOR SHEET, ROTOR, AND ELECTRICAL MACHINE, AND METHOD FOR PRODUCING A ROTOR

RELATED APPLICATIONS

The present application is based on, and claims priority from, German Application No. DE 10 2018 132 502.9 filed Dec. 17, 2018, the disclosure of which is hereby incorporated by reference herein in its entirety.

The present invention relates to a rotor sheet for a permanently excited electrical machine, which comprises a central cut-out for a shaft and is divided into a plurality of sectors, each including a first half sector and a second half sector that is delimited from the first half sector by a radial central line, wherein a first through-opening configuration, including a magnet pocket through-opening, which has two parallel edge lines extending along an extension direction, is formed inside the first half sector, and a further through-opening configuration, which is mirror-symmetrical to the first through-opening configuration with respect to the central line, is formed inside the second half sector.

The invention furthermore relates to a rotor for a permanently excited electrical machine, to an electrical machine for a vehicle, and to a method for producing a rotor.

Document EP 3 352 331 A1 discloses a rotor sheet for a permanently excited electric motor, comprising a plurality of elongated cut-outs, introduced into the rotor sheet in circumferential configurations, for accommodating permanent magnets, wherein the cut-outs are oriented in such a way that each cut-out extends obliquely with respect to a radial direction, wherein two cut-outs, which adjoin one another in the circumferential direction and are arranged in a V shape with respect to one another and which are arranged mirror-symmetrically with respect to an interposed mirror axis extending in the radial direction, are provided for forming a rotor pole.

So as to achieve high power density, electrical machines comprising a rotor laminated core made of such rotor sheets must be operable at a high rotational speed. The higher the rotational speed, the higher is the mechanical stress that the rotor sheet or the rotor laminated core has to withstand, which is generated, on the one hand, by centrifugal forces caused by the weight of permanent magnet magnetic elements and by an inherent weight of the laminated rotor stack, and, on the other hand, by a load, which is present even in the idle state, as a result of an interference fit of the rotor laminated core on a shaft. Consequently, the speed of the electrical machine must be limited so that the mechanical stresses do not exceed maximum values for the mechanical strength of the rotor sheet. This, however, also limits the utilization or performance capability of the electrical machine, or necessitates an accordingly stronger and more complex design of the rotor laminated core.

Document U.S. Pat. No. 9,246,363 B2 discloses a rotating electrical machine, comprising a rotor composed of rotor sheets having salient poles. The poles have one or more holes, which are positioned so as to reduce the peak stress experienced by the individual sheets when the rotor is rotating.

It is the object of the invention to provide an option for operating a permanently excited electrical machine in a mechanically more robust manner.

To achieve this object, it is provided, according to the invention, in a rotor sheet of the type mentioned at the outset that the first through-opening configuration includes a relief through-opening that is located completely in the first half sector and has a radially innermost point located further to the inside than a radially innermost point of the magnet pocket through-opening, wherein the relief through-opening is inscribed inside an incircle-free trapezoid having two bases extending parallel to the central line, of which a first base is located closer to the central line than a second base, a first leg, which extends on a first straight line having a first angular spacing from the central line, and a second leg, which extends on a second straight line having a second angular spacing from the central line, wherein the first straight line and the second straight line intersect on the side of the first base at an acute angle, and the first angular spacing and the second angular spacing are each larger than a magnet pocket angular spacing of the extension direction from the central line.

The invention is based on the realization that regions of each sector in which the magnet pocket through-openings of the two half sectors are located closely together are structurally particularly weak, and that mechanical stresses arising due to centrifugal forces are particularly concentrated in these regions. A significant reduction in mechanical stress can be achieved in the regions by introducing the relief through-opening if this is non-circular, so that it can be inscribed inside the incircle-free trapezoid, and the trapezoid, together with the inscribed relief through-opening, is tilted with respect to the magnet pocket through-opening in such a way that the respective angular spacing of the first and second straight lines is larger than the magnet pocket angular spacing. The mechanical stress is thus shifted into other, structurally stronger regions of the sector, thereby yielding a reduction in mechanical stress in the structurally weak region.

The rotor sheet according to the invention is thus advantageously characterized by higher mechanical robustness. In this way, an electrical machine can be formed which can be operated at a higher speed until a maximum value of the mechanical stress is reached in the structurally weak regions, while the configuration is otherwise kept identical, or which, conversely, can be configured to have less mechanical strength when designed for a predefined maximum speed, which lowers the manufacturing complexity. As an alternative or in addition, a larger tolerance range can be provided for forming an interference fit, due to the reduced mechanical stresses caused by centrifugal forces. This is because, with higher strength to resist centrifugal forces, higher mechanical stress may be allowed by the interference fit, which is already present in the idle state.

Within the meaning of the invention, the wording "inscribed" shall be understood to mean that the relief through-opening is delimited by the sides of the trapezoid, that is, by the legs and the bases, and makes contact with each side in at least one point. Within the meaning of the invention, the term "incircle-free" means that no circle can be inscribed inside the trapezoid. In other words, the trapezoid is not a tangent quadrangle. Within the meaning of the invention, the term "angular spacing" denotes a directional angular dimension in a plane of the rotor sheet that completely extends through the relief through-opening. The orientation of all angular spacings in the plane is identical.

The rotor sheet, as a whole, is typically circular and thus typically has a circular edge contour. The rotor sheet is typically made of a soft magnetic material. A distance between the parallel edge lines of the magnet pocket through-opening is typically smaller, and, in particular, smaller by at least a factor of 2, than the length of the edge lines. Moreover, a further free space can adjoin a rectangular receiving region, delimited by the edge lines, on the central line side, the free space not being taken up by a magnetic element in the mounted state. A projection may be formed between an edge line and the free space. The free space can have a substantially triangular shape, wherein an, in particular radially innermost, corner can be rounded. The free space typically forms the radially innermost point of the magnet pocket through-opening. What was said above with respect to the first free space can apply analogously to this free space. Moreover, a further free space may be formed on the side opposite the receiving region. The angular spacing of the extension direction, proceeding from the central line, is typically at least 40°, preferably at least 45°, particularly preferably at least 50°, and/or no more than 89°, preferably no more than 75°, and particularly preferably no more than 60°.

It is preferred in the case of the rotor sheet according to the invention if the relief through-opening has a first edge line, which extends at least along a portion of the first straight line. As an alternative or in addition, the relief through-opening can have a second edge line, which extends at least along a portion of the second straight line.

Particularly high relief is achieved when a ratio of a largest section, which is placed perpendicularly onto the first edge line and ends on the second edge line, to a smallest section, which is placed perpendicularly onto the first edge line and ends on the second end line, is at least 1.00, preferably at least 1.15, and particularly preferably at least 1.30. As an alternative or in addition, the ratio of the largest section, which is placed perpendicularly onto the first edge line and ends on the second edge line, to the smallest section, which is placed perpendicularly onto the first edge line and ends on the second end line, can be no more than 2.60, preferably no more than 2.10, and particularly preferably no more than 1.85. At such a ratio, the relief through-opening advantageously has a substantially elongated shape in the circumferential direction.

The first edge line and the second edge line are particularly preferably connected by an arcuate edge section. The arcuate edge section typically makes contact with the first base in only one point. However, it is also conceivable for the arcuate edge section to extend partially along the first base and, from there, to transition in an arcuate manner into the first edge line and/or the second edge line.

Empirically, it was found that a difference between the first angular spacing and the magnet pocket angular spacing is expediently at least 23.5°, preferably at least 25°, and particularly preferably at least 26.5°, and/or no more than 45°, preferably no more than 38°, and particularly preferably no more than 31°. As an alternative or in addition, a difference between the second angular spacing and the magnet pocket angular spacing can be at least 12°, preferably at least 15°, and particularly preferably at least 21°, and/or no more than 30°, preferably no more than 25°, and particularly preferably no more than 24°.

Typically, the first angular spacing is no more than 120°, preferably no more than 100°, and particularly preferably no more than 90°.

Expediently, a ratio of a distance between the first base and the central line to a distance between the radially innermost point of the magnet pocket through-opening and the central line is at least 0.60, preferably at least 1.2, and particularly preferably at least 1.9, and/or no more than 2.5, preferably no more than 2.3, and particularly preferably no more than 2.2.

It is furthermore advantageous in the case of the rotor sheet according to the invention when a ratio of an outer radial distance of the radially outermost point of the relief through-opening to an outside radius of the rotor sheet is at least 0.21, preferably at least 0.25, and particularly preferably at least 0.27, and/or no more than 0.32, preferably no more than 0.30, and particularly preferably no more than 0.29.

It may furthermore be provided on the rotor sheet according to the invention that a ratio of an inner radial distance of the radially innermost point of the relief through-opening to an outside radius of the rotor sheet is at least 0.55, preferably at least 0.60, and particularly preferably at least 0.62, and/or no more than 0.70, preferably no more than 0.68, and particularly preferably no more than 0.65.

According to a particularly preferred embodiment of the rotor sheet according to the invention, it is provided that the relief through-opening has a further edge line, which is located on at least a portion of a third straight line intersecting the second leg and the second base. The further edge line is typically connected to the first edge line by an arcuate section and/or to the second edge line by an arcuate section. An angular spacing of the third straight line from the extension direction of the edge lines of the magnet pocket through-opening is preferably at least 60° and no more than 150°, wherein the angular spacing is between 60 and 75° in a preferred embodiment.

So as to enable a particularly advantageous double-V arrangement of magnetic elements, it may be provided on the rotor sheet according to the invention that the first through-opening configuration includes a further magnet pocket through-opening, which has two parallel edge lines extending along a further extension direction, wherein straight lines on which a respective edge line of the further magnet pocket through-opening is located intersect the central line radially further to the outside than straight lines on which a respective edge line of the first magnet pocket through-opening is located. In particular, the further magnet pocket through-opening can also comprise the above-described free spaces. The distance between the edge lines of the further magnet pocket through-opening is typically smaller than the distance between the edge lines of the first magnet pocket through-opening.

So as to enable as smooth an operation of the electrical machine as possible, the rotor sheet according to the invention can furthermore include at least one balancing through-opening, which, in particular, forms part of the first through-opening configuration and the radially innermost point of which is located further to the inside than the radially innermost point of the relief through-opening. The or a respective balancing through-opening is typically circular. Preferably, two balancing through-openings are provided, which have differing surface areas.

The object underlying the invention is furthermore achieved by a rotor for a permanently excited electrical machine, comprising a rotor laminated core formed by several stacked rotor sheets according to the invention, wherein a permanent magnet magnetic element is arranged inside a respective magnet pocket formed by magnet pocket through-openings located on top of one another. Typically, the relief through-openings located on top of one another are not interspersed with a material. The rotor preferably additionally comprises a shaft, which extends through the cutouts of the rotor sheets and is attached to the rotor laminated core by way of an interference fit.

The object underlying the invention is furthermore achieved by an electrical machine for a vehicle, comprising a stator and a rotor according to the invention, which is rotatably mounted with respect to the stator.

In addition, the object underlying the invention is achieved by a method for producing a rotor for a permanently excited electrical machine, wherein multiple rotor sheets according to the invention are arranged to form a rotor laminated core in such a way that respective through-opening configurations are congruent.

It may be provided in the case of the method according to the invention that the rotor laminated core is balanced by introducing at least one balancing weight into the balancing through-openings of at least one through-opening configuration of a particular rotor sheet. In this way, what is known as positive balancing of the rotor laminated core or of the rotor is achieved.

As an alternative or in addition, the rotor laminated core can be balanced by creating at least one through-opening through the arranged rotor sheets. Negative balancing of the rotor laminated core or of the rotor is thus achieved.

All comments made with respect to the rotor sheet according to the invention can be applied analogously to the rotor according to the invention, to the electrical machine according to the invention and to the method according to the invention, so that the aforementioned advantages can also be achieved with these.

Further advantages and details of the present invention will be apparent from the exemplary embodiments described hereafter and based on the drawings. These are schematic illustrations. In the drawings.

Figure 9:
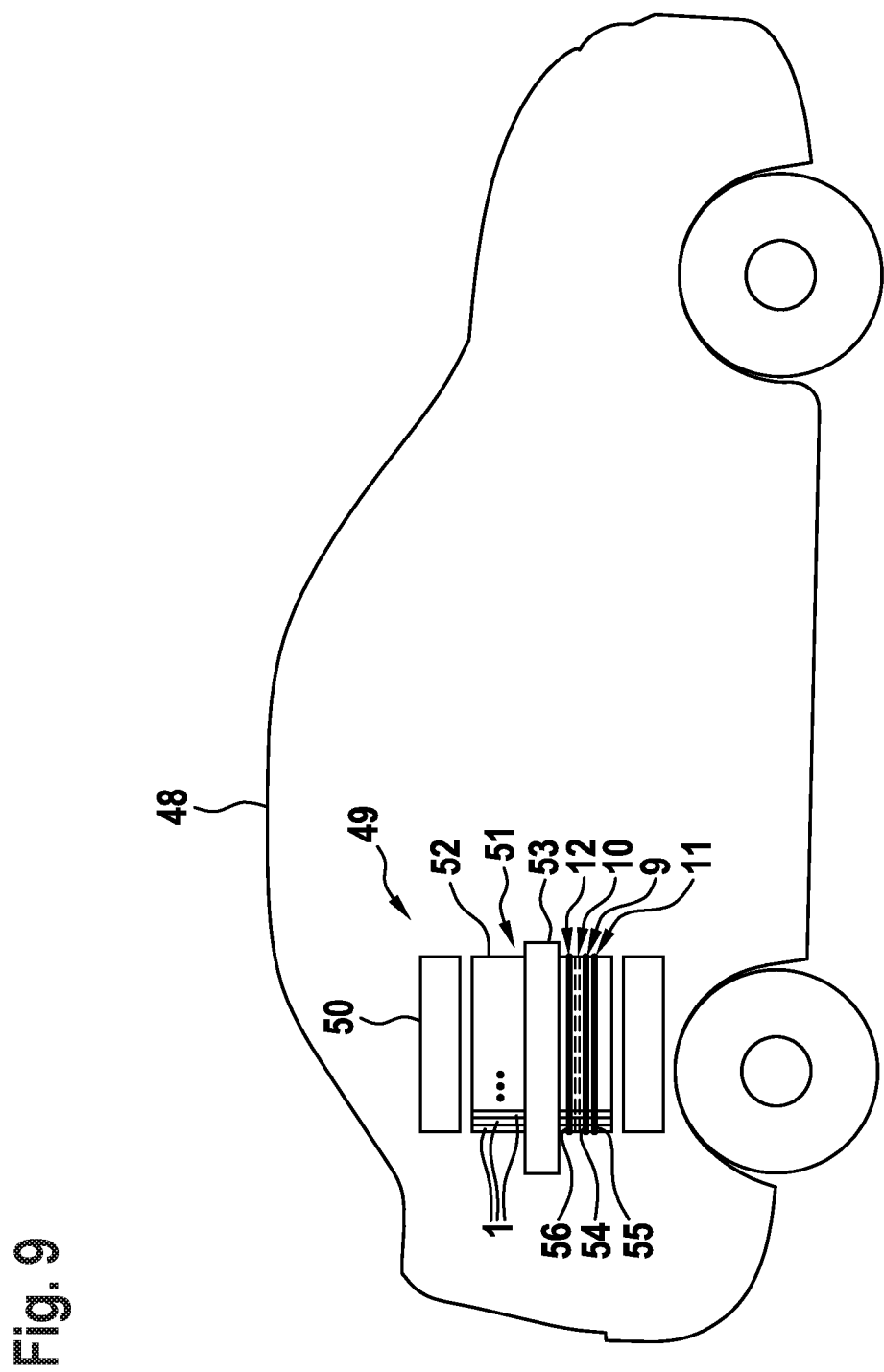
Figure 10:
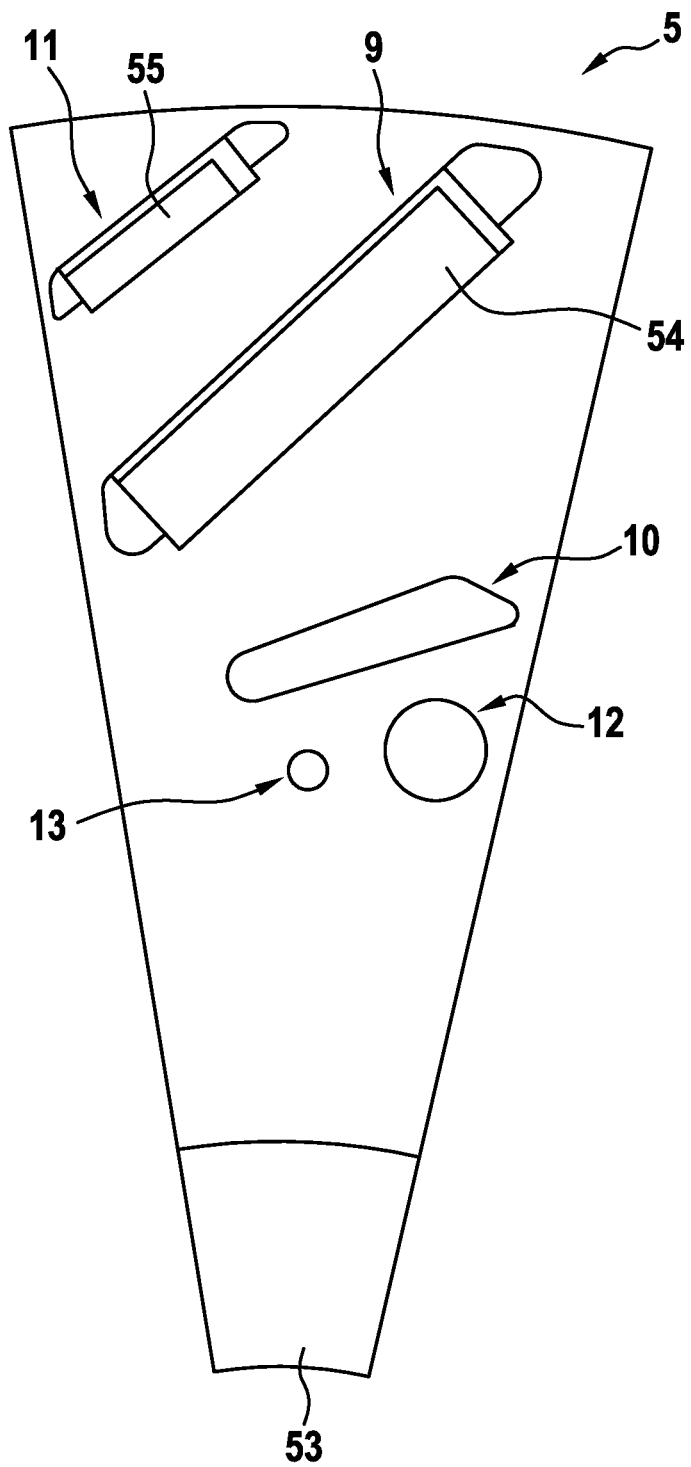

FIGS. 3 to 8 each show a first half sector of a sector of a further exemplary embodiment of the rotor sheet according to the invention;

FIG. 9 shows a schematic diagram of a vehicle comprising an exemplary embodiment of the electrical machine according to the invention, including an exemplary embodiment of the rotor according to the invention; and FIG. 10 shows a first half sector of a sector of a rotor sheet of the rotor shown in FIG. 9, including magnetic elements.

Figure 1:
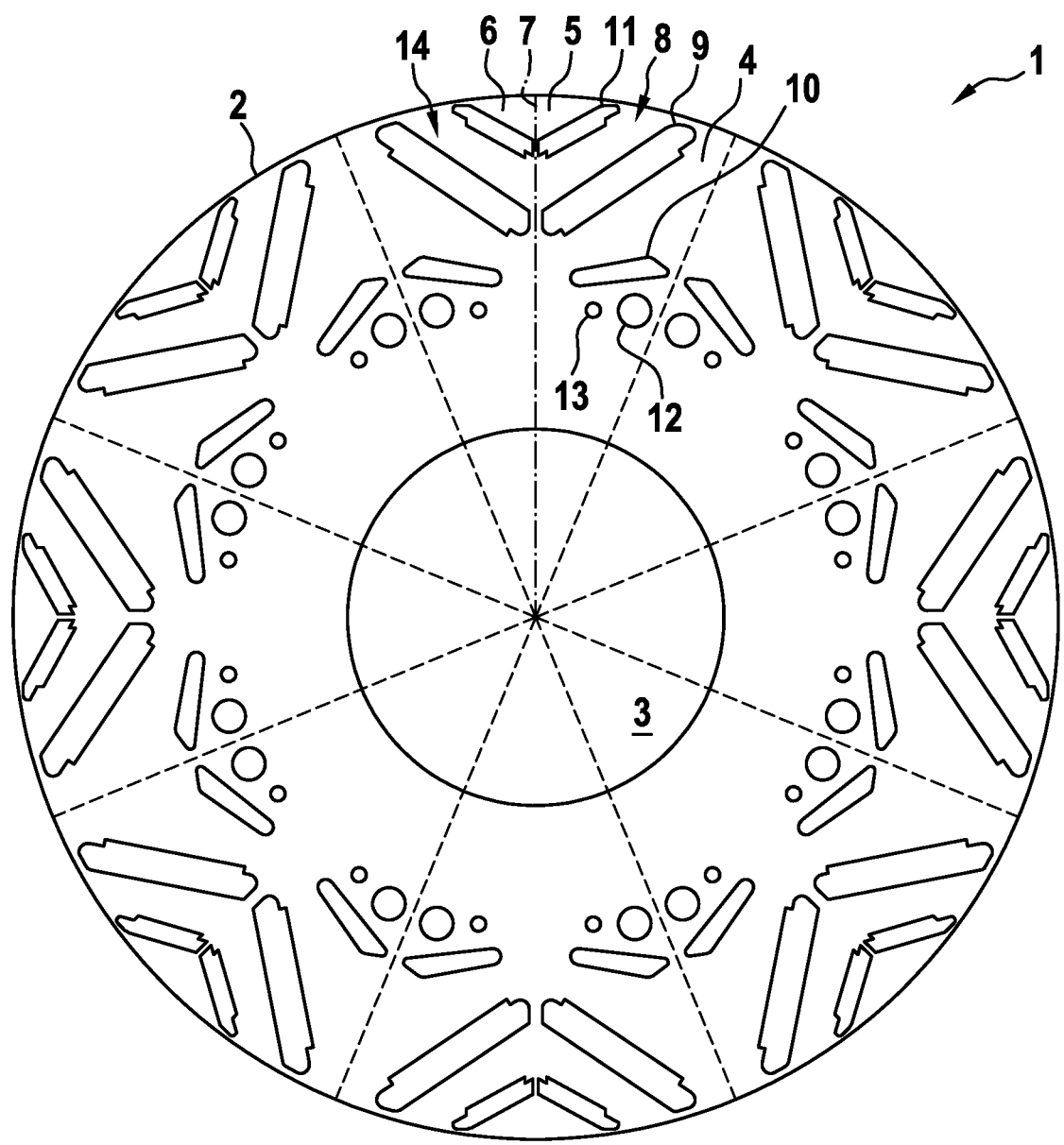
FIG. 1 shows a top view onto a first exemplary embodiment of the rotor sheet according to the invention.

FIG. 1 shows a top view onto a first exemplary embodiment of a rotor sheet 1.

The rotor sheet 1 has a circular outer contour 2 and a central cut-out 3. The rotor sheet 1 is divided into eight sectors 4, which directly abut one another. Each sector 4 thus takes up 45° of the entire rotor sheet 1. Each of the sectors 4 is divided into a first half sector 5 and into a second half sector 6 along a radial central line 7. A first through-opening configuration 8 is provided in the first half sector 5, which includes a first magnet pocket through-opening 9, a relief through-opening 10, a second magnet pocket through-opening 11, a first balancing through-opening 12, and a second balancing through-opening 13.

A further through-opening configuration 14 is provided in the second half sector 6, which is mirror-symmetrical to the first through-opening configuration 8 of the first half sector 5 with respect to the central line 7. The description that the through-opening configurations 8, 14 are mirror-symmetrical with respect to one another, however, does not mean that the half sectors 5, 6 overall have to be mirror-symmetrical to one another, even though this is the case in the exemplary embodiment according to FIG. 1. In particular, the cut-out 3 may also not be circular with respect to a provided attachment on a shaft and can, for example, include straight flattened regions on two opposite sides. Accordingly, not all sectors 4 have to be identical, even though this is the case in the present exemplary embodiment. The aforementioned mirror symmetry thus refers only to the position of through-openings in the first half sector 5 and in the second half sector 6 which form part of the through-opening configurations 8, 14.

Figure 2:
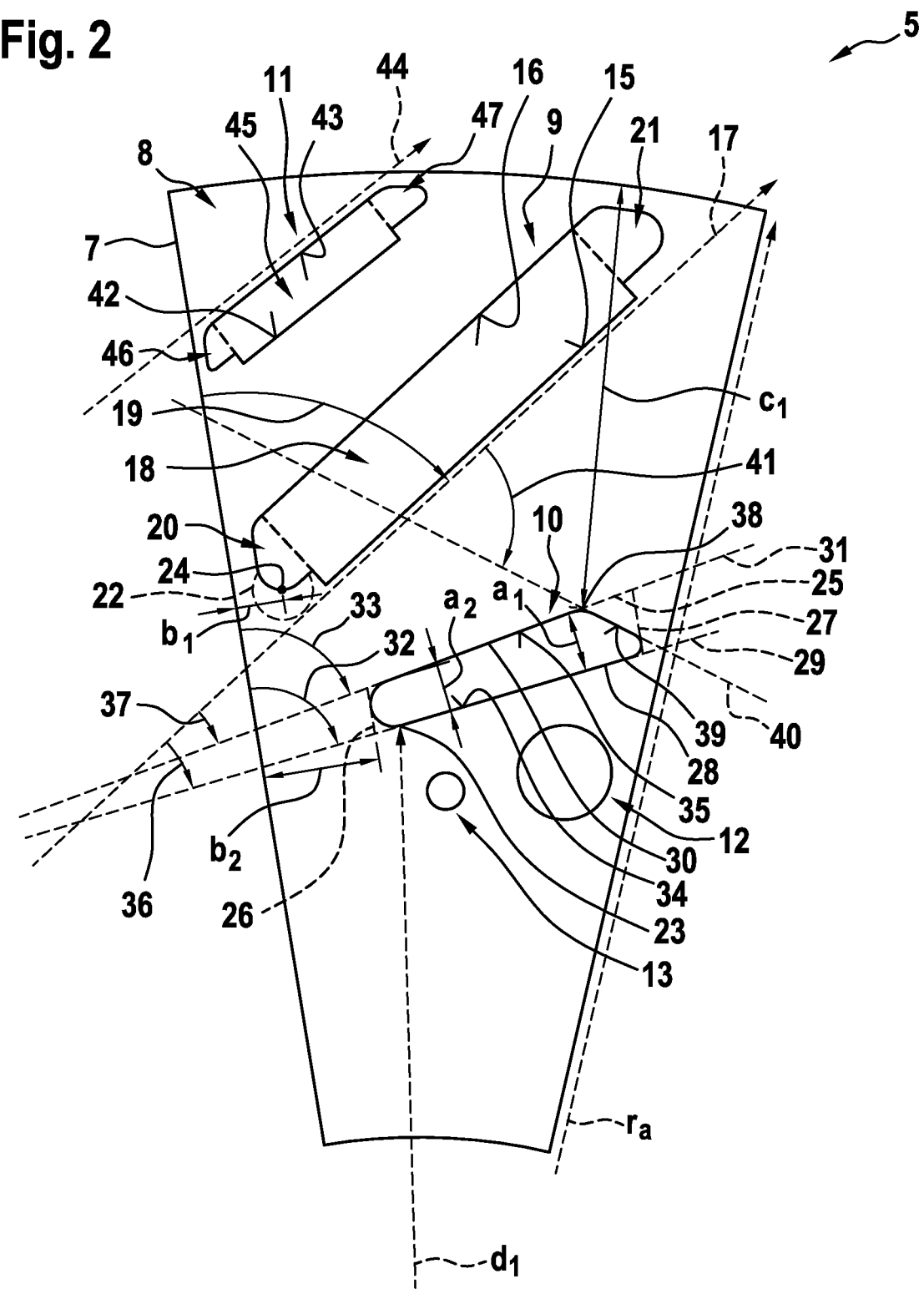
FIG. 2 shows a detailed view of a first half sector of a sector of the rotor sheet shown in FIG. 2.

FIG. 2 shows a detailed view of a first half sector 5 of one of the sectors 4 of FIG. 1. Due to the mirror symmetry of the through-opening configurations 8, 14, the comments made with regard to the first half sector 5 can be applied accordingly to the second half sector 6. Likewise, the comments made with regard to the sector 4 can be applied to the other sectors.

The first magnet pocket through-opening 9 has two parallel edge lines 15, 16, which extend along an extension direction 17 and delimit a substantially rectangular receiving space 18. The extension direction 17 has a magnet pocket angular spacing 19 from the central line 7. A first free space 20 adjoins the receiving space 18 on the central line side, and a second free space 21 adjoins on the opposite side, which are delimited by edge contours that adjoin the edge lines 15, 16 and have an arcuate progression at least in sections.

During an operation of an electrical machine comprising a laminated core formed by the rotor sheet 1, excessive local mechanical stresses occur in a region 22, which result from centrifugal forces of a magnetic element taking up the receiving space 18 and from the inherent weight of the rotor sheet 1. Since the region 22 is structurally weak due to the low material thickness of the rotor sheet 1 between the magnet pocket through-opening 9 in the first half sector 5 and the mirror-symmetrical magnet pocket through-opening in the second half sector 6, a maximum speed exists, up to which the rotor sheet is able to withstand the load from the centrifugal forces and from additional stress, present even in an idle state, as a result of an interference fit in the cut-out 3. The relief through-opening 10 allows the mechanical stresses in the region 22 to be reduced compared to a conventional rotor sheet without such a relief through-opening 10.

The relief through-opening 10 is located completely in the first half sector 5. The radially innermost point 23 thereof is located further to the inside than the radially innermost point 24 of the magnet pocket through-opening 9. The relief through-opening is inscribed inside an incircle-free trapezoid 25. The trapezoid 25 has two bases 26, 27 parallel to the central line 7, wherein a first base 26 is located closer to the central line 7 than a second base 27. A first leg 28 of the trapezoid 25 extends on a first straight line 29, and a second leg 30 of the trapezoid 25 extends on a second straight line 31. The straight lines 29, 31 intersect on the side of the central line 7 at an acute angle, wherein a first angular spacing 32 of the first straight line 29 from the central line 7 is larger than a second angular spacing 33 of the second straight line 31 from the central line 7, and larger than the magnet pocket angular spacing 19. The second angular spacing 32 is also larger than the magnet pocket angular spacing 19.

The relief through-opening 10 has a first edge line 34, which extends along a portion of the first straight line 29, and a second edge line 35, which extends along a portion of the second straight line 31. A ratio $a_1/a_2$ of a largest section $a_1$, which is placed perpendicularly onto the first edge line 34 and ends on the second edge line 35, to a smallest section $a_2$, which is placed perpendicularly onto the first edge line 34 and ends on the second end line 35, is 1.38 in the present exemplary embodiment. Moreover, a difference 36 between the first angular spacing 33 and the magnet pocket angular spacing 19 is 27°, and a difference 37 between the second angular spacing 33 and the magnet pocket angular spacing 19 is 22°.

Additionally, a distance $b_1$ between the radially innermost point 24 of the first magnet pocket through-opening and the central line 19, and a distance $b_2$ between the first base 26 and the central line 7 are plotted in FIG. 2, wherein a ratio $b_2/b_1$ is 2.1 in the present exemplary embodiment.

In addition, an outer radial distance $c_1$ of the radially outermost point 38 of the relief through-opening 10 is plotted in FIG. 2. A ratio $c_1/r_a$ of the radial distance $c_1$ to the outside radius $r_a$ of the rotor sheet 1 is 0.28 in the present example.

FIG. 2 furthermore shows an inner radial distance $d_1$ of the radially innermost point 24 of the relief through-opening 10, wherein a ratio $d_1/r_a$ of the inner radial distance $d_1$ to the outside radius $r_a$ of the rotor sheet 1 is 0.65.

The relief through-opening 10 furthermore has a third edge line 39, which is located on a portion of a third straight line 40 intersecting the second leg 25 and the second base 27. A third angular spacing 41 of the third straight line 40 from the extension direction 17 of the magnet pocket through-opening 9 is 67° in the present example.

The second magnet pocket through-opening 11 likewise has two parallel edge lines 42, 43, which extend along a second extension direction 44. The central line 7 is intersected by straight lines (not shown) on which a respective edge line 15, 17 of the first magnet pocket through-opening 9 is located, further to the inside than by straight lines (not shown) on which the edge lines 42, 43 of the second magnet pocket through-opening 11 are located. The second magnet pocket through-opening 11 is thus located further to the outside than the first magnet pocket through-opening 9. Incidentally, a receiving space 45 of the second magnetic configuration 11 is also smaller than that of the first magnet pocket through-opening 9. The second magnet pocket through-opening 11 additionally also comprises free spaces 46, 47 adjoining the receiving space 45.

The respective balancing through-openings 12, 13 are located further to the inside than the first relief through-opening 9 and are circular, wherein a center of the first balancing through-opening 12 is located further to the outside than a center of the second balancing through-opening 13.

When using the rotor sheet 1 according to FIG. 1 and FIG. 2, maximum mechanical stress of 419.64 MPa arises in region 22 in an exemplary configuration of an electrical machine, such as is shown in FIG. 9, for example, at a rotational speed of 16,800 rpm.

FIG. 3 to FIG. 8 each show a first half sector 5 of a sector of a further exemplary embodiment of a rotor sheet, wherein identical or like-acting components are denoted by identical reference numerals. The magnet pocket through-openings 9, 11 correspond to those of the first exemplary embodiment.

In the exemplary embodiments according to FIG. 3 to FIG. 8, the respective relief through-openings 10 have different geometries. These are described based on the following table with reference to the parameters shown in FIG. 2, wherein additionally the maximum mechanical stress $\sigma_{max}$ in the region 22 of the above-described exemplary configuration is provided:

|  | FIG. 3 | FIG. 4 | FIG. 5 | FIG. 6 | FIG. 7 | FIG. 8 |
| --- | --- | --- | --- | --- | --- | --- |
| $a_2/a_1$ | 1.75 | 2.57 | 1.80 | 2.11 | 1.65 | 2.20 |
| Difference 36 | 30° | 38° | 37° | 36° | 34° | 34° |
| Difference 37 | 22° | 22° | 23° | 23° | 21° | 17° |
| $b_2/b_1$ | 1.30 | 1.30 | 1.00 | 1.00 | 0.67 | 2.00 |
| $c_1/r_a$ | 0.29 | 0.28 | 0.28 | 0.28 | 0.26 | 0.28 |
| $d_1/r_a$ | 0.63 | 0.63 | 0.60 | 0.62 | 0.60 | 0.61 |
| Angular spacing 41 | 103° | 116° | 108° | 115° | 140° | 140° |
| $\sigma_{max}$ in MPa | 422.53 | 436.42 | 458.80 | 462.72 | 466.36 | 469.08 |

Incidentally, FIG. 4 shows an alternative embodiment of the arrangement of the balancing through-openings 12, 13, which can be applied to the remaining exemplary embodiments. In the exemplary embodiment according to FIG. 6, the balancing through-opening 12 is semicircular and complements a balancing through-opening of the second half sector 6 of an adjoining sector 4, which can likewise be applied to the remaining exemplary embodiments. Balancing through-openings are dispensed with in the exemplary embodiments according to FIG. 5, FIG. 7 and FIG. 8. However, as an alternative, these may also be provided according to the remaining exemplary embodiments.

FIG. 9 shows a schematic diagram of a vehicle 48 comprising one exemplary embodiment of a permanently excited electrical machine.

The electrical machine 49 is configured to drive the vehicle 48 and comprises a stator 50. A rotor 51, which comprises a rotor laminated core 52 and a shaft 53, is rotatably mounted inside the stator 50. The rotor laminated core 52 is formed of a plurality of identical rotor sheets 1 according to one of the above-described exemplary embodiments. The rotor sheets 1 are stacked on top of one another in such a way that the through-opening configurations 8, 14 thereof are congruent. The rotor sheets are furthermore laminated so as to be electrically insulating with respect to one another.

FIG. 9 furthermore shows a first magnetic element 54, which extends through the first magnet pocket through-openings 9, and a second magnetic element 55, which extends through the second magnet pocket through-openings 11. The relief through-openings 10 remain free.

Within the scope of the production of the rotor 51, a balancing weight 56 is introduced into the first balancing through-openings 12 of one or more sectors 4, whereby the rotor 51 is positively balanced. As an alternative or in addition, it is possible to introduce through-openings into the rotor sheets 1 that are already stacked to form the rotor laminated core 52 within the scope of the production of the rotor 51, so as to negatively balance the rotor 51.

FIG. 10 finally shows the first half sector 5 according to FIG. 2 when installed in the rotor 51, so that the positions of the magnetic elements 54, 55 and of the shaft 53 are visible.

The invention claimed is:

1. A rotor sheet (1), for a permanently excited electrical machine (49), comprises a central cut-out (3) for a shaft (53) and is divided into a plurality of sectors (4), each of the plurality of sectors (4) including a first half sector (5) and a second half sector (6) that is delimited from the first half sector (5) by a radial central line (7), a first through-opening configuration (8), including a magnet pocket through-opening (9) that has two parallel edge lines (15, 16) extending along an extension direction (17), being formed inside the first half sector (5), and a further through-opening configuration (14) that is mirror-symmetrical to the through-opening configuration (8) with respect to the central line (7), being formed inside the second half sector (6), wherein the first through-opening configuration (8) includes a relief through-opening (10) that is located completely in the first half sector (5) and has a radially innermost point (23) located further to the inside than a radially innermost point (24) of the magnet pocket through-opening (9), the relief through-opening (10) being inscribed inside an incircle-free trapezoid (25) having two bases (26, 27) extending parallel to the central line (7), wherein a first base (26) of the two bases (26, 27) is located closer to the central line (7) than a second base (27) of the two bases (26, 27), a first leg (28) that extends on a first straight line (29) having a first angular spacing (32) from the central line (7), and a second leg (30) that extends on a second straight line (31) having a second angular spacing (33) from the central line (7), the first straight line (29) and the second straight line (31) intersecting on the side of the first base (26) at an acute angle, and the first angular spacing (32) and the second angular spacing (33) each being larger than a magnet pocket angular spacing (19) of the extension direction (17) from the central line (7).

2. The rotor sheet according to claim 1, wherein the relief through-opening (10) has a first edge line (34) that extends at least along a portion of the first straight line (29), and/or a second edge line (35) that extends at least along a portion of the second straight line (31).

3. The rotor sheet according to claim 2, wherein a ratio (a2/a1) of a largest section (a2) that is placed perpendicularly onto the first edge line (34) and ends on the second edge line (35), to a smallest section (a1) that is placed perpendicularly onto the first edge line (34) and ends on the second end line (35), is at least 1.00, preferably at least 1.15, and further preferably at least 1.30, and/or no more than 1.85, preferably no more than 2.10, and further preferably no more than 2.60.

4. The rotor sheet according to claim 1, wherein a difference (36) between the first angular spacing (32) and the magnet pocket angular spacing (19) is at least 23.5°, preferably at least 25°, and further preferably at least 26.5°, and/or no more than 31°, preferably no more than 38°, and further preferably no more than 45° and/or a difference (37) between the second angular spacing (32) and the magnet pocket angular spacing (19) is at least 12°, preferably at least 15°, and further preferably at least 21° and/or no more than 24°, preferably no more than 25°, and further preferably no more than 30°.

5. The rotor sheet according to claim 1, wherein a ratio (b2/b1) of a distance (b2) between the first base (26) and the central line (7) to a distance (b1) between the radially innermost point (24) of the magnet pocket through-opening (9) and the central line (7) is at least 0.60, preferably at least 1.2, and further preferably at least 1.9, and/or no more than 2.2, preferably no more than 2.3, and further preferably no more than 2.5.

6. The rotor sheet according to claim 1, wherein a ratio (c1/ra) of an outer radial distance (c1) of the radially outermost point (38) of the relief through-opening (10) to an outside radius (ra) of the rotor sheet (1) is at least 0.21, preferably at least 0.25, and further preferably at least 0.27, and/or no more than 0.29, preferably no more than 0.30, and further preferably no more than 0.32.

7. The rotor sheet according to claim 1, wherein a ratio ($d_1$/ra) of an inner radial distance ($d_1$) of the radially innermost point (23) of the relief through-opening (10) to an outside radius (ra) of the rotor sheet (1) is at least 0.55, preferably at least 0.60, and further preferably at least 0.62, and/or no more than 0.65, preferably no more than 0.68, and particularly further preferably no more than 0.70.

8. The rotor sheet according to claim 1, wherein the relief through-opening (10) has a further edge line (39) that is located on at least portion of a third straight line (40) intersecting the second leg (30) and the second base (27).

9. The rotor sheet according to claim 1, wherein the first through-opening configuration (8) has a further magnet pocket through-opening (11) that has two parallel edge lines (42, 43) extending along a further extension direction (44), straight lines on which a respective edge line (42, 43) of the further magnet pocket through-opening (11) is located intersecting the central line (7) radially further to the outside than straight lines on which a respective edge line (15, 16) of the first magnet pocket angular spacing (9) is located.

10. The rotor sheet according to claim 1, comprising at least one balancing through-opening (12, 13) that forms part of the first through-opening configuration (8) and the radially innermost point of which is located further to the inside than the radially innermost point (23) of the relief through-opening (10).

11. A rotor (51) for a permanently excited electrical machine (49), comprising a rotor laminated core (52) formed by a plurality of stacked rotor sheets (1) according to claim 1, a permanent magnet magnetic element (54, 55) being arranged inside a respective magnet pocket formed by magnet pocket through-openings (9, 11) located on top of one another.

12. An electrical machine (49) for a vehicle (48), comprising a stator (50) and a rotor (51) according to claim 11 mounted rotatably with respect to the stator.

13. A method for producing a rotor (51) for a permanently excited electrical machine (49), a plurality of rotor sheets (1) according to claim 1 being arranged in such a way to form a rotor laminated core (52) that respective through-opening configurations (8, 14) are congruent.

14. The method according to claim 13, wherein a rotor sheet according to claim 10 is used, the rotor laminated core (52) being balanced by introducing at least one balancing weight (56) into the balancing through-openings (12, 13) of at least one through-opening configuration (8, 14) of a respective rotor sheet (1).

15. The method according to claim 13, wherein the rotor laminated core (52) is balanced by creating at least one through-opening through the arranged rotor sheets (1).

* * * * *